United States Patent [19]

Otsuka et al.

[11] 3,881,546

[45] May 6, 1975

[54] AIR CONDITIONER FOR AUTOMOTIVE VEHICLES

[75] Inventors: Yoshinori Otsuka; Masakatsu Hayashi, both of Tokyo; Jun Ichi Mantoku, Yao; Susumu Yamazaki, Tokyo; Akira Tomita, Hitachi; Masanori Musou, Katsuta, all of Japan

[73] Assignee: Hitachi, Ltd., Tokyo, Japan

[22] Filed: Aug. 21, 1973

[21] Appl. No.: 390,304

[30] Foreign Application Priority Data
Sept. 1, 1972 Japan.............................. 47-87168

[52] U.S. Cl. ...................... 165/42; 165/64; 62/305
[51] Int. Cl. ............................................. B60h 3/00
[58] Field of Search............ 165/58, 64, 23, 42–44, 165/126; 62/305

[56] References Cited
UNITED STATES PATENTS

| 2,247,987 | 7/1941 | Carson | 165/126 |
| 3,122,893 | 3/1964 | Millman | 62/305 |
| 3,428,115 | 2/1969 | Caldwell | 165/23 |

Primary Examiner—Charles Sukalo
Attorney, Agent, or Firm—Craig & Antonelli

[57] ABSTRACT

All of the component parts except a compressor of an air conditioner for automotive vehicles are mounted within a unit casing consisting of a condenser casing and a duct casing, the unit casing being mounted within a compartment.

10 Claims, 9 Drawing Figures 3,881,546

AIR CONDITIONER FOR AUTOMOTIVE VEHICLES

BACKGROUND OF THE INVENTION

The present invention relates to an air conditioner for automotive vehicles.

In the air conditioners for automotive vehicles a compressor is generally disposed at one side of an engine, a condenser is disposed in front of a radiator, and an evaporator and an expansion valve are disposed adjacent to a dashboard in a compartment. Therefore the conventional air conditioners have the following defects:

Since the various component parts are disposed at various positions within the compartment, the length of pipe line interconnecting these component parts is very long thus resulting in pressure and thermal losses. Furthermore the pipe line for condensed refrigerant is extended through the high temperature engine room so that the cooling efficiency is decreased.

Since the condenser is disposed adjacent to the radiator, it is heated by radiant heat dissipated from the radiator, thus resulting in a decrease in cooling efficiency. Conversely the cooling efficiency of the radiator is adversely affected by heat dissipated from the condenser, thus resulting in a decrease in engine efficiency.

Since the component parts are not mounted as a unit, the assembly and maintenance are adversely affected.

SUMMARY OF THE INVENTION

The primary object of the present invention is therefore to overcome the above and other defects and disadvantages encountered in the conventional air conditioners for automotive vehicles.

Briefly stated, the present invention is characterized in that all of the component parts except the compressor of an air conditioner are assembled as a unit so that the overall length of pipe line may be considerably reduced and the compressor may be prevented from being adversely affected by heat dissipated by the radiator.

Figure 1:
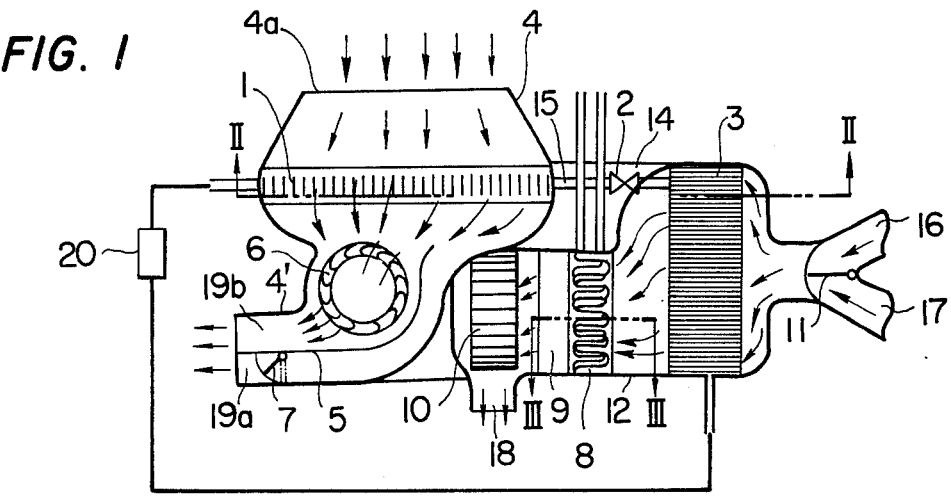
FIG. 1 is a sectional view taken along the line I—I of FIG. 2 illustrating a first embodiment of an air conditioner in accordance with the present invention.
Figure 2:
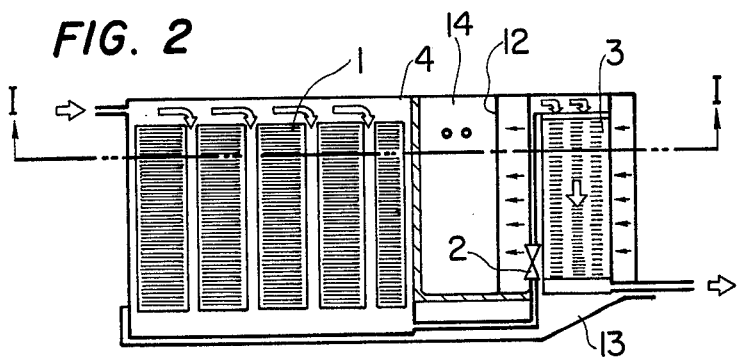
FIG. 2 is a sectional view taken along the line II—II of FIG. 1.
Figure 3:
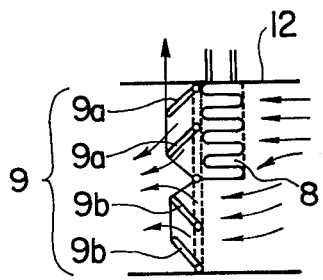
FIG. 3 is a sectional view taken along the line III—III of FIG. 1.
Figure 4:
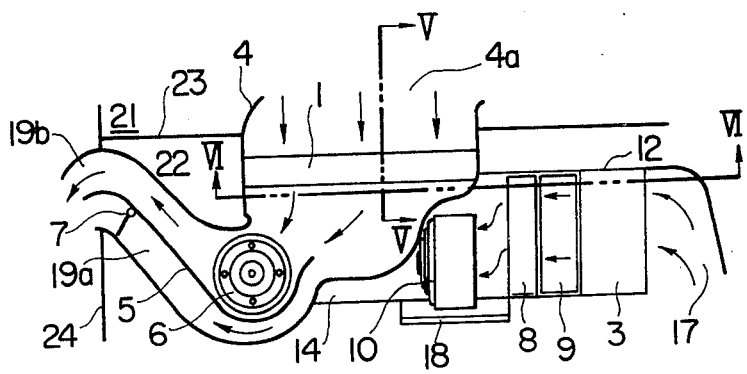
FIG. 4 is a sectional view of a second embodiment of an air conditioner in accordance with the present invention.
Figure 5:
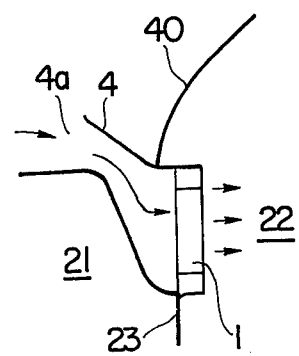
FIG. 5 is a sectional view taken along the line V—V of FIG. 4.

DESCRIPTION OF THE PREFERRED EMBODIMENT (First Embodiment, FIGS. 1–3)

First referring to FIGS. 1, 2 and 3 the first embodiment of the present invention will be described. Reference numeral 1 denotes a condenser for cooling and liquefying the compressed refrigerant supplied from a compressor 20; 2, an expansion valve for regulating the flow of the liquid refrigerant; 3, an evaporator for vaporizing the liquid refrigerant injected through the expansion valve 2, thereby cooling the surrounding air; 15, a pipe for coupling the condenser 1 through the expansion valve 2 to the evaporator 3; 4, a condenser casing for introducing air into the condenser 1 and discharging the air out of the condenser 1; 5, a partition plate for dividing the outlet section 4' of the condenser casing 4; 6, a condenser cooling fan mounted in a discharge passage of the casing 4; 7, a counterflow preventive damper disposed in a discharge passage 19b of the casing 4 so that when an automotive vehicle stops the damper may prevent the suction of air by the fan 6; 8, a heater disposed behind the evaporator 3; and 9, an air dampar adapted to control the flow rate of heated air to be sucked by a duct fan 10 to be described hereinafter after passing through the heater 8 and the flow rate of cool air to be directly sucked by the duct fan 10, thereby controlling the temperature to be discharged from the duct fan 10.

As shown in FIG. 3, the air damper 9 is such that when the opening of the heated air guide vanes 9a is increased the opening of the cooled air guide vanes 9b is decreased. The duct fan 10 is adapted to mix the heated and cooled air so that the air whose temperature is suitably controlled may be discharged into a compartment through an outlet 18. A damper 11 is adapted to control the mixing ratio of the air sucked from the room through an inlet 17 and fresh air sucked through an inlet 16 from the surrounding atmosphere. A duct casing 12 confines the air flow in the air conditioner, and a tank 13 is provided in order to receive water condensed by the condenser 3 when air passes therethrough. The bottom of the condenser 1 is immersed into water in the tank 13. The casings 4 and 12 constitutes a part of a unit casing 14.

The compressed vapor refrigerant forced into the condenser 1 from the compressor 20 is cooled not only by the fan 6 but also the air forced into the casing 4 when the vehicle is running, and the condensed liquid refrigerant is forced into the evaporator 3 through the expansion valve 2 so that heat of surrounding air is removed when the liquid refrigerant is vaporized. The vaporized refrigerant is returned back to the compressor 20 and is compressed again.

A part of air which is cooled when passing through the evaporator 3 is heated by the heater 8, flows through the damper 9 is mixed with the remaining cooled air by the duct fan 10 so that the mixed air with a suitably controlled temperature is discharged into the room.

(second Embodiment, FIGS. 4–8)

Next referring to FIGS. 4–8, the second embodiment will be described hereinafter. The inlet 4a of the condenser casing 4 is opened at a partition wall 23 which partitions a passenger compartment 22 from the front 21 of a vehicle, and the other component parts are all mounted within the compartment 22. Since the inlet 4a is directed toward the front of the vehicle, air with a ram pressure enters into the condenser casing 4. Reference numeral 40 denotes a window.

Figure 6:
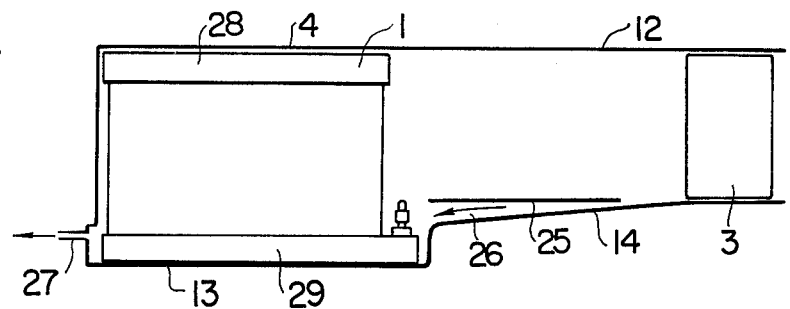
FIG. 6 is a sectional view taken along the line VI—VI of FIG. 4 (a heater, an air mixing damper and so on being not shown)
Figure 7:
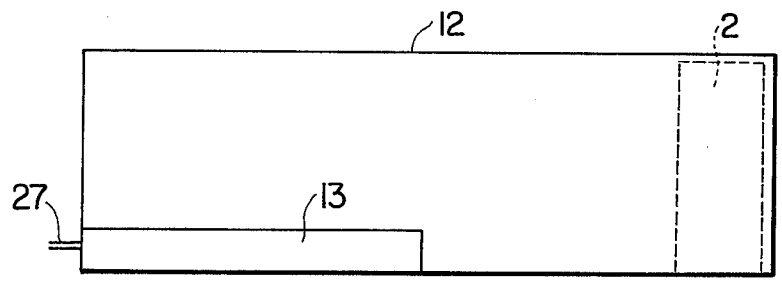
FIG. 7 is a bottom view thereof.

The air discharge passages 19a and 19b are opened at the compartment wall 24. The unit case 14 is provided with a partition wall, and water condensed by the evaporator 3 flows through a passage 26 (See FIG. 6) into the tank 13. The tank 13 is formed only around the bottom of the condenser 1 as shown in FIGS. 6 and 7, and is provided with a drain pipe 27.

Figure 8:
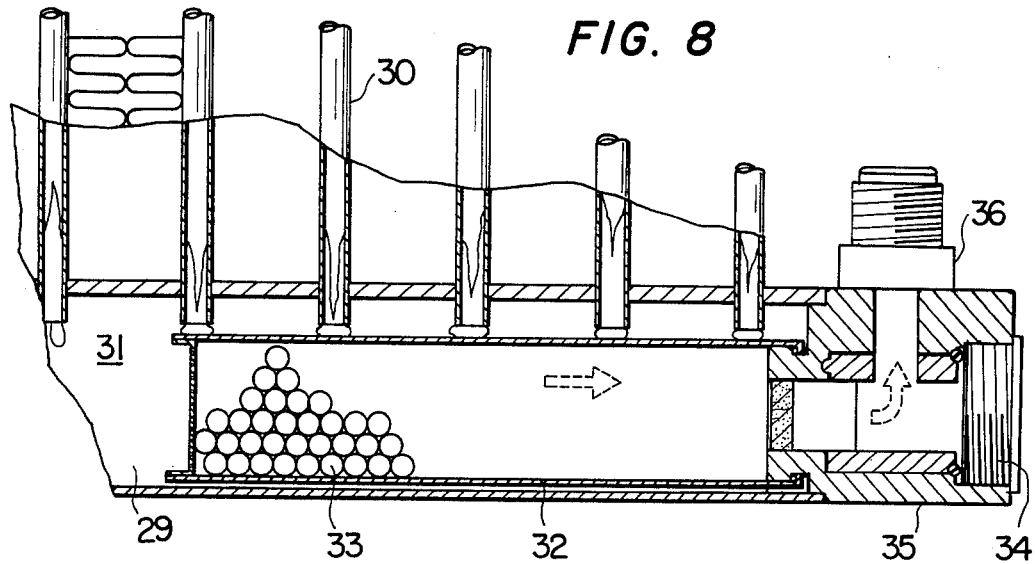
FIG. 8 is a fragmentary view, on enlarged scale, of a condenser.
Figure 9:
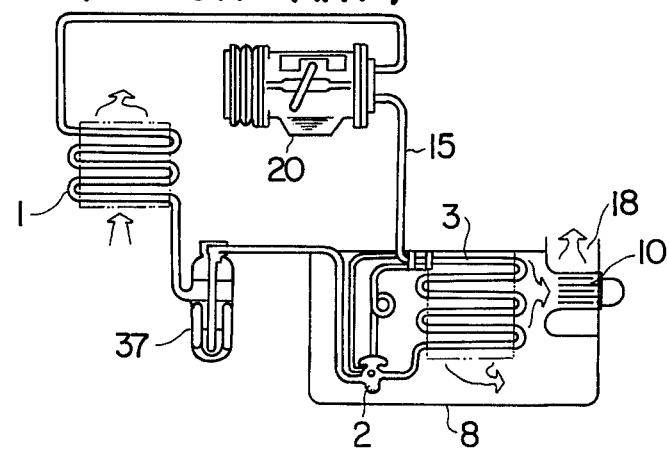
FIG. 9 is a view illustrating the arrangement of a conventional air conditioner an automotive vehicle.

The condenser 1 has an upper head 28 and a lower header 29 which is located within the tank 13. As shown in FIG. 8 the lower head 29 comprises a chamber 31 into which are opened the lower ends of tubes 30, and a strainer 32 removably inserted into the chamber 31. Reference numeral 33 denotes drying agent; 34, a set screw; 35, a refrigerant discharge header; 36, a union at the refrigerant outlet. The chamber 31 functions as a liquid tank 37 in the conventional air conditioner shown in FIG. 9. In case of a condenser in which two headers are disposed on the right and left sides thereof, a liquid tank is also formed within the header.

According to the present invention the component parts except a compressor are assembled as a unit so that the piping 15 which is used to interconnect various component parts may be reduced in length and the assembly, maintenance and inspection may be facilitated.

Since the piping 15 through which refrigerant flows from the condenser to the evaporator is short and is not extended through the engine room the refrigerant is prevented from being heated so that the cooling efficiency may be considerably increased.

The bottom of the condenser 1 is immersed in water condensed by the evaporator 3 and the condenser is mounted remote from the radiator of the engine so that the cooling efficiency is further increased.

The discharge passage of the condenser 1 is divided into two sections, and the fan 6 is disposed in one of the divided sections so that even when the cooling by air with a ram pressure is not expected as the vehicle stops the minimum flow of cooling air may be secured by the fan 6 and when cooling by air is carried out as the vehicle is traveling, air may be discharged from the condenser 1 through both of the passages 19a and 19b. Therefore better cooling may be ensured regardless of the fact that the vehicle is running or is stopped. More particularly the fan 6 is generally limited to be mounted on the left side from the center. When the discharge passage is divided into two passages 19a and 19b and the fan 6 is not disposed in the passage 19a corresponding to the right side of the condenser whose efficiency is dropped when the vehicle is running, the fan 6 will not be a resistance to the air flow in the passage 19a so that all of the surfaces of the condenser may be efficiently utilized. When the vehicle is stopped, the air may be forced to flow by the fan so that the cooling efficiency may be increased.

What is claimed is:

1. An air conditioner for installation within an automotive vehicle comprising:
   compressor means,
   condenser means in fluid flow communication with said compressor means for receiving refrigerant to be condensed from said compressor means, said condenser means being disposed within a condenser casing having a bottom portion, said condenser casing also having an inlet directed toward a front portion of the vehicle and an outlet opened at a side portion of the vehicle,
   condenser cooling fan means disposed between said condenser means and said outlet,
   a duct casing provided with two air inlets adapted to receive air from a vehicle compartment and from the atmosphere surrounding the vehicle, respectively, said duct casing also being provided with an outlet opened into a vehicle compartment,
   refrigerant evaporator means arranged within said duct casing in fluid flow communication with said condenser means, and heater means and duct fan means arranged within said duct casing with the heater means downstream of said evaporator means, said evaporator means having a lower portion, and
   said duct casing being assembled with said condenser casing as a unitary structure with said evaporator means arranged opposite said condenser means within said unitary structure and with said heater means and said duct fan means arranged between said condenser means and said evaporator means.

2. An air conditioner as defined in claim 1 wherein the condenser casing, between said condenser means and said outlet thereof, is divided into two air flow passages, and wherein said condenser cooling fan means is disposed in one of said two air flow passages with a nonreturn valve disposed in the other air flow passage.

3. An air conditioner as defined in claim 1, wherein a drain water tank or reservoir is formed integral with said condenser casing at the bottom portion thereof, and a water flow passage intercommunicating between a portion below or adjacent to the lower portion of said evaporator means and said tank or reservoir is extended through a unit casing which interconnects said duct casing and said condenser casing.

4. An air conditioner for an automotive vehicle comprising:
   compressor means,
   condenser means in fluid flow communication with said compressor means to receive refrigerant to be condensed from said compressor means, said condenser means being disposed with a condenser casing having a bottom portion,
   means including a refrigerant evaporator in fluid flow communication with said condenser means, said means being arranged within a duct casing for cooling ambient air and supplying the cooled air to a compartment of said vehicle, and
   air heating means arranged within said duct casing, wherein said duct casing and said condenser casing are adapted to be installed in the vehicle as a unitary structure.

5. The air condition of claim 4, wherein the vehicle has a dashboard under which the duct casing and condenser casing are installed as a unit.

6. An air conditioner for an automotive vehicle comprising:
   compressor means,
   condenser means in fluid flow communication with said compressor means to receive refrigerant to be condensed from said compressor means, said condenser means being disposed within a condenser casing having a bottom portion,
   means including a refrigerant evaporator in fluid flow communication with said condenser means, said means being arranged within a duct casing for cooling ambient air and supplying the cooled air to a compartment of said vehicle, said duct casing and said condenser casing being adapted to be installed in the vehicle as a unitary structure, wherein the means within the duct casing further comprises air heating means, and duct fan means, and wherein the duct casing and the condenser casing are arranged as a unitary structure with the air heating means and duct fan means being arranged between the refrigerant evaporator means and condenser means.

7. The air conditioner of claim 6, wherein the vehicle has a dashboard under which the unitary structure is installed.

8. The air conditioner of claim 6, wherein the condenser casing has an air inlet directed toward a front portion of the vehicle and an air outlet directed toward a side portion of the vehicle.

9. The air conditioner of claim 8, wherein the duct casing has an air inlet directed toward a side portion of the vehicle.

10. The air conditioner of claim 6, wherein the duct casing and condenser casing constitute parts of a unit casing.

* * * * *